Figure 3:
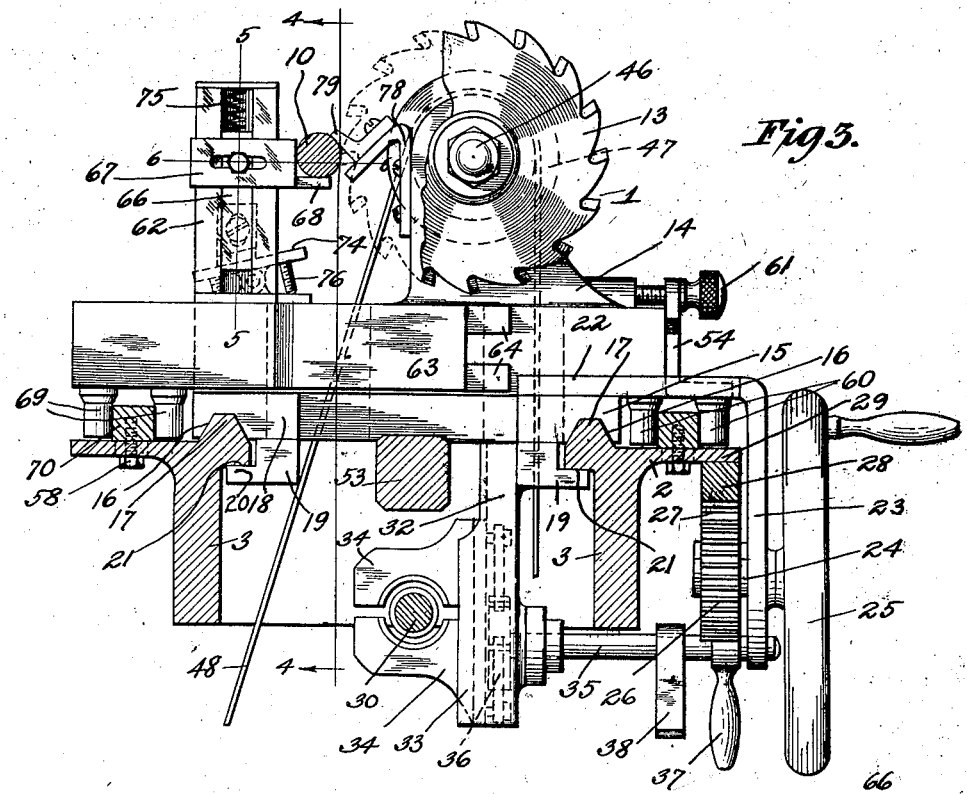

Feb. 19, 1924.  
G. ALBER  
WOOD TURNING LATHE  
Filed July 23, 1921  
1,484,286  
3 Sheets-Sheet 1
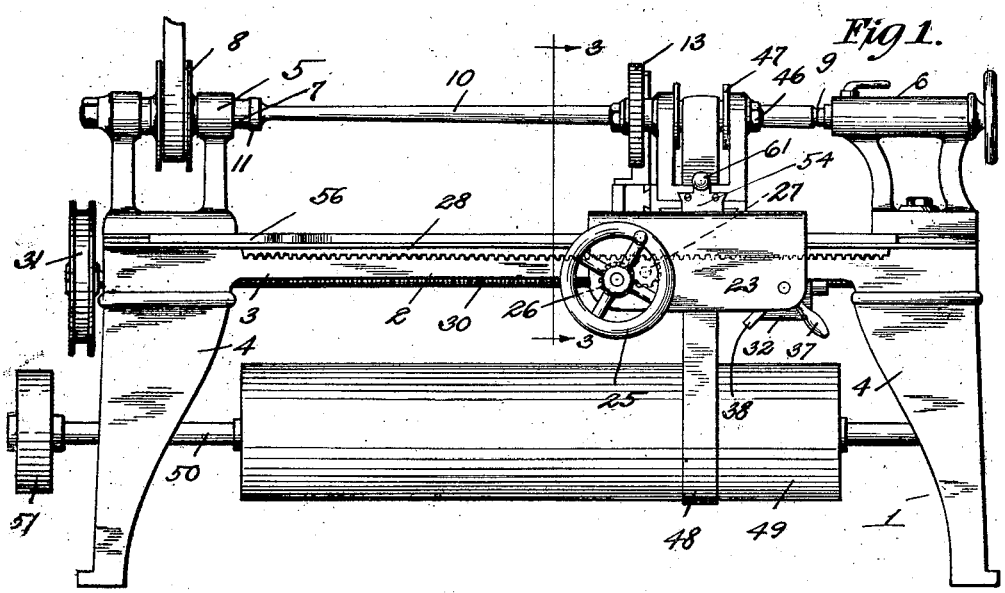
Inventor  
George Alber  
By C. C. Shepherd  
Attorney Feb. 19, 1924.

G. ALBER

WOOD TURNING LATHE

Filed July 23, 1921

1,484,286

3 Sheets-Sheet 2

Inventor
George Alber
By C. C. Shepherd
Attorney

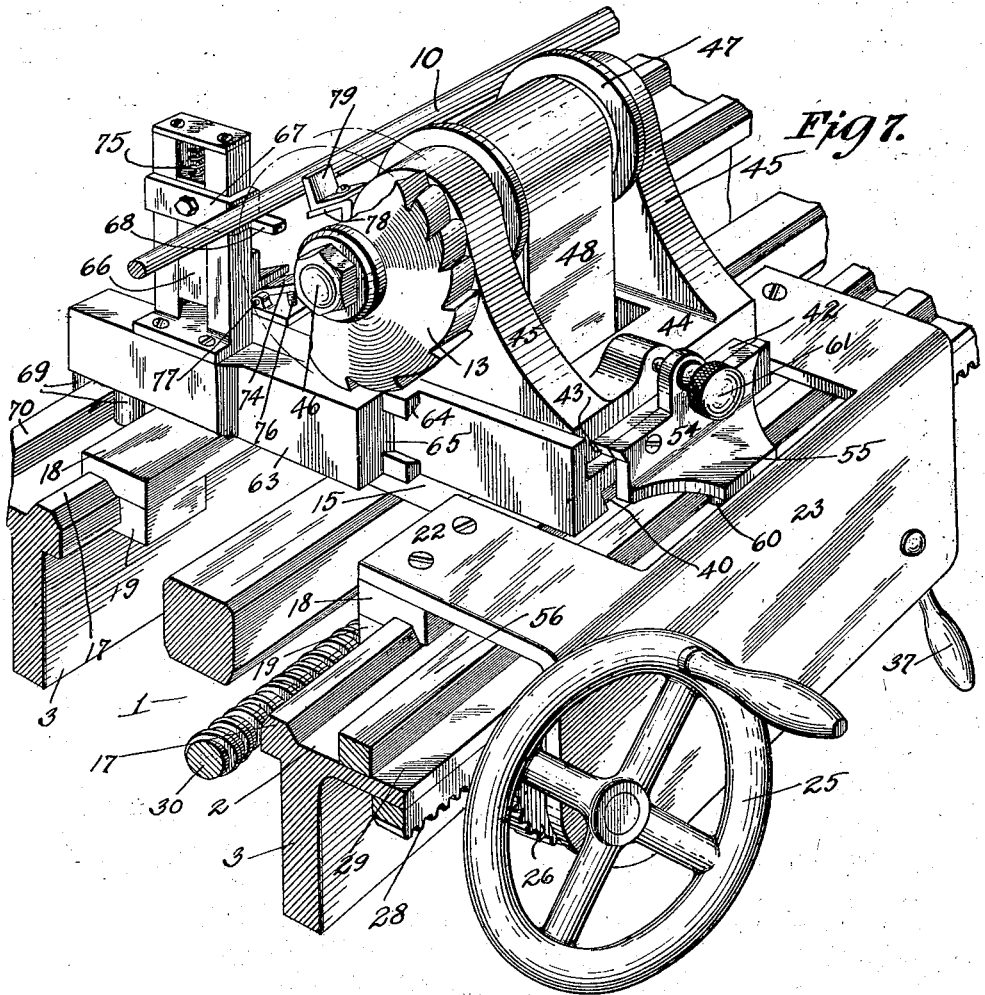

Patented Feb. 19, 1924.

1,484,286

UNITED STATES PATENT OFFICE.

GEORGE ALBER, OF COLUMBUS, OHIO, ASSIGNOR OF ONE-HALF TO H. W. UNKEL, OF COLUMBUS, OHIO.

WOOD-TURNING LATHE.

Application filed July 23, 1921. Serial No. 487,116.

*To all whom it may concern:*

Be it known that GEORGE ALBER, a citizen of the United States, residing at Columbus, in the county of Franklin and State of Ohio, has invented certain new and useful Improvements in Wood-Turning Lathes, of which the following is a specification.

This invention relates to improvements in wood turning lathes, and has for its primary object to provide a machine or lathe whereby stock handled thereby may be turned in an effective or efficient manner to produce smooth round stock wherein a longitudinal taper is present.

Another object of the invention resides in the provision of a wood turning lathe which is to be principally employed for the purpose of producing the shafts of golf sticks or clubs, wherein it is necessary that such shafts be formed to include smooth, perfectly rounded longitudinally tapering shafts, in order that the clubs may be employed to the best advantage. Heretofore, the operation of finishing a golf club has ordinarily been done by manual operations, owing to the fact that such a high degree of accuracy is necessary, manufacturers of golf clubs have relied upon manual skill to produce clubs of proper balance wherein the shafts are carefully shaped so that the same will be absolutely straight from a standpoint of their longitudinal axis and wherein the desired rounded cylindrical construction will be present with a uniform taper, which will extend from the handle ends of the shafts to the club ends. It is well known that if these features do not obtain an imperfect club will be produced and one which can not be relied upon by the user thereof.

The present invention therefore consists in the provision of a wood turning lathe capable of producing finished stock for use in golf club construction and which will be capable of finishing the stock with a greater degree of accuracy than can be accomplished by hand operations, and also with far less production expense.

Other objects of the invention reside in providing a lathe with an improved longitudinally movable rotatable cutter with novel supporting means for retaining the stock in connection with the lathe and in cooperation with the cutter, the construction being such that the cutter may be shifted transversely of the lathe automatically and by regulated means in order that the taper produced in the stock may be accordingly varied and controlled, the construction, therefore, for effecting the support and mounting of the rotary cutter and the stock associated therewith constituting one of the important features of the present invention.

For a further understanding of the specific nature of the invention and to one of the practical embodiments thereof, reference is to be had to the following description and to the accompanying drawings, the scope of the invention being particularly defined in the appended claim.

Figures 4, 5, 6:
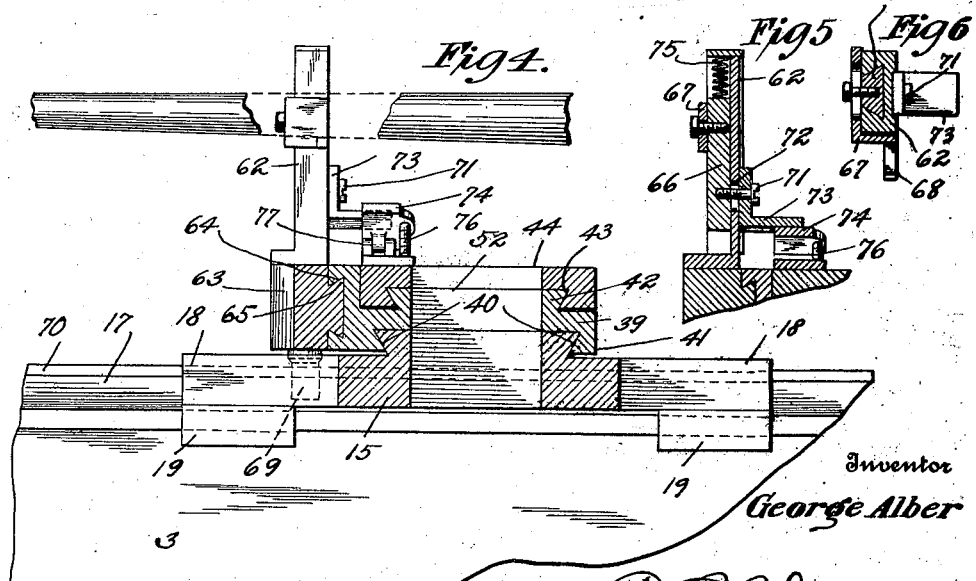

In the accompanying drawings:

Figure 1 is a side elevation of a wood turning lathe constructed in accordance with the present invention, Figure 2 is a top plan view thereof, Figure 3 is a transverse vertical sectional view taken on the line 3—3 of Figure 1, Figure 4 is a vertical longitudinal sectional view taken through the lathe and illustrating more particularly the construction of and the mounting for the traveling work holder, the plane of the section being indicated by the line 4—4 of Figure 3, Figure 5 is a vertical section taken through the traveling work support or holder on the line 5—5 of Figure 3, Figure 6 is a transverse sectional view taken on the line 6—6 of Figure 3, Figure 7 is a detail perspective view disclosing more particularly the bed of the lathe, the longitudinal shiftable carriage mounted thereon, the traveling work holder and the rotary cutter construction, Figure 8 is a detail sectional view disclosing the manner of positioning one end of a club shaft in the spindle of the head stock, and Figure 9 is a similar view disclosing the manner of positioning the other end of the stick or shaft in the dead spindle of the tail stock.

Referring to the accompanying drawings, the numeral 1 designates the improved lathe, comprising the present invention, in its entirety. Fundamentally, the lathe consists of a base or bed 2 which is generally of rectangular form and includes parallel longitudinally extending side bars 3, and from the corners of the bed the lathe is provided with the usual depending rigidly constructed legs 4, which are adapted to rest upon the floor so as to maintain the bed 2 on the usual horizontal plane common to machines of this character. At the opposite ends of the bed 2 there are provided the head and tail stock members 5 and 6 respectively, the head stock being provided with the usual longitudinally extending rotatable chuck 7, which in this instance is adapted to be driven by means of a belt passing around a pulley 8 connected with the chuck, the tail stock being provided with the usual pointed stud 9, located in alignment with the longitudinal axis of the chuck 7, and by means of this construction the stock may be suitably supported for rotation between the members 5 and 6 in the usual manner customary to machines of this character. In this instance the shank 10 of a golf stick or club is shown confined for rotation between the head and tail stock members and supported in connection therewith by forming the head end 11 of the shank with a reduced tapering extension 12, which is usually employed in connecting the head of a golf club to the lower end of the shank. This extension 12 is utilized in the present machine by positioning the same within the socket of the chuck 7 so as to be carried by said chuck and to rotate therewith, the opposite end, or the gripping extremity of the shaft, is positioned in contact with the end of the pointed stud 9 of the tail stock. It will be apparent that by longitudinally adjusting the stud 9, in the ordinary manner, the shank of a golf stick may be securely yet removably retained in connection with the lathe for turning purposes. The shafts 10, before being placed in the lathe, are first roughly turned to assume substantially the shape disclosed in Figure 1 by means of a doweling machine, and are then turned down by the lathe 1 for the purpose of accurately and properly finishing the stock and adapting the same to the finished product, the purpose of the lathe being to properly round the shaft, to render the same absolutely straight and true and to produce a longitudinal taper in the length of the stick which will serve for the purpose of rendering the completed club relatively resilient or flexible and therefore of greater efficiency in practical service.

To finish the stick and to secure the above results there is provided a cutter 13, which is mounted in connection with a traveling carriage 14, the latter being disposed for movement longitudinally of the lathe bed, in order that the cutter 13 may engage with the club shaft 10 along the full length of the latter to generally finish and true the same, the said carriage being of peculiar construction in order that regulated lateral movement on the part of the cutter may take place, thus adapting the cutter to the taper found throughout the length of the club shaft.

The construction of the carriage involves a base plate 15, which is formed on its under surface, with longitudinally extending substantially V shaped grooves 16, which are adapted to receive parallel shears 17 integrally formed with the bed 2 which constitute guides for the plate 15 and enable the latter to be moved longitudinally of the bed 2, the said plate being provided with longitudinal extensions 18, which increase the bearing area between the plate and the shears 17 for the purpose of rendering the base substantial and not likely to tilt or rock in operation. This tendency is further precluded by providing the under surface of the extensions 18 with lugs 19, which are provided with outwardly projecting fingers 20, the latter being disposed to engage with shouldered faces 21 provided on the bars 3 immediately beneath the shears 17.

To effect travel on the part of the carriage, longitudinally of the bed 2, certain of the extensions 18, to one side of the lathe, have their upper surfaces connected with horizontal tongues 22 provided in conjunction with a vertically disposed apron 23, which extends parallel with and to one side of one of the side bars 3. The apron 23 serves to provide a bearing for the reception of a rotatable shaft 24, which has its outer end equipped with a hand wheel 25 and its inner end with a spur gear 26. This gear also meshes with a second spur gear 27, which is rotatably mounted upon a stud axle projecting inwardly from the apron 23, and the gear 27 is positioned on a plane above that of the shaft 24, in order that the gear 27 will be enabled to mesh with the teeth of a rack 28, fixed to the under side of one of the legs 29 of a side bar 3. Manifestly, by rotating the hand wheel 25 movement will be imparted to the gears 26 and 27, and since the gear 27 is in mesh with the rack 28 longitudinal movement on the part of the base plate 15 and the carriage 14 generally will be produced. By this construction the carriage may be caused to travel longitudinally of the lathe 1, and by means of hand power.

Ordinarily, the carriage is longitudinally shifted automatically and by means of power applied to the lathe from an outside source. Thus, a feed screw 30 is journaled in connection with the bed 2 so as to rotate beneath the carriage 14, one end of the screw in this instance being equipped with a pulley 31 to permit of the application of power to the screw 30. The carriage or base plate 15 is provided with a depending extension 32 which is formed to comprise a vertical guide 33 for the reception of a pair of slidable jaws 34, which are adapted to be engaged or disengaged with the screw 30. When drawn together the jaws 34 will grip the threads of the screw so that longitudinal movement will be imparted the carriage, but when separated the said jaws are moved to a position out of engagement with the screw, thus stopping the movement of the carriage. To control the operation of the jaws, the extension 32 and the apron 23 are provided with bearings for the reception of a rotatable shaft 35, and the inner end of this shaft is connected with links 36, which in turn have their outer ends connected with the jaws 34. By this construction it will be manifest that the rotation of the shaft 35 will by reason of the links 36 draw the jaws 34 together or spread the same apart, thus controlling their driving relationship with respect to the screw 30. The rotation of the shaft 35 may be effected by means of a hand lever 37, or by means of a crank arm 38, which latter is adapted to be fixed to the shaft 35 and is capable of engaging the fixed abutments at the opposite ends of the bed 2, whereby when the carriage reaches predetermined positions upon the bed 2 the said crank arm will be operated to automatically stop movement on the part of the carriage, as will be clearly understood.

Slidably mounted upon the base plate 15 for movement transversely of the bed 2 is the intermediate plate 39 of the carriage. This plate has its under surface provided with a dovetail groove 40, which is adapted to receive dovetail projections 41 formed upon the upper part of the plate 15, the dovetail union between the plates 15 and 39 serving to permit the latter to be shifted laterally of the lathe but not vertically thereof, and by use of the plate 39 a mounting is provided for the cutter 13 which will enable the teeth of the latter to be maintained in proper engagement with the tapered shank 10 of the stock. It will be observed that the upper surface of the plate 39 is also provided with a dovetail projection 42, which is adapted to be received within a similarly formed groove 43 provided in the under part of a top plate 44, the said top plate being adjustable transversely of the lathe 1 in a manner independent of the intermediate plate 39, but restrained from moving vertically with respect to the intermediate plate. The plate 44 includes vertically spaced upwardly extending bracket arms 45, in which is journaled a cutter shaft 46, the said shaft having its outer end connected with the rotary milling cutter 13 which is adapted for engagement with the shaft 10. The shaft 46, between the arms 45, is equipped with a pulley 47, around which is passed an endless belt 48, the latter also being trained over a longitudinally extending drum 49, which is rotatably supported in connection with a power driven shaft 50, the latter being supported in conjunction with the legs 4, and equipped with a belt wheel 51. By reason of the length of the drum 49 it will be apparent that power will be imparted to the pulley 47 throughout the entire length of longitudinal travel of the carriage. The plates 15, 39 and 44 are provided with registering openings 52, through which the belt 48 is permitted to pass, the said belt extending downwardly between the side bars 3 and to each side of the centrally disposed bar 53 of the bed 2.

To effect the lateral shifting of the carriage 14 and consequently the cutter 13 so that the latter may at all times conform and properly engage with the longitudinal taper of the shaft 10, the intermediate plate 39 includes a fixed bracket 54 which is located at one end of the plate 39 and includes a horizontally extending shelf 55. The upper surface of one of the side bars 3 is equipped with an adjustable guide strip 56. This strip is centrally pivoted as at 57, and is provided with binding screws 58, contiguous to its ends, the said screws being disposed for movement within transverse slots 59 formed in one of the side bars 3. By reason of the central pivot of the strip 56, it will be manifest that the latter may be adjusted so that it will properly conform with the shaft 10 and will extend in parallelism therewith, the strip being capable of being retained within any of its adjusted positions by means of the screws 58. The under sides of the shelf 55 and the plate 22 are equipped with vertically journaled rollers 60, which are adapted to engage with the opposite sides of the strip 56. By this construction it will be manifest that when the carriage is moved longitudinally of the lathe on the parallel shears 17, shifting movement will be automatically imparted to the plates 39 and 44, and consequently the cutter 13 by reason of the engagement of the rollers 60 with the opposite sides of the guide strip 56, this latter movement taking place because of the fact that the said guide strip is situated to extend parallel with the tapered stock 10 and therefore at an angle to the straight longitudinally extending shears 17 of the lathe. This lateral adjustment on the part of the carriage enables the cutter to evenly and properly engage with the round surface of the stock 10, and cause a taper to be produced in the stock in accordance with the setting of the strip 56.

To compensate for the effects of wear on the cutter 13, the top plate 44 is made adjustable with respect to the intermediate plate 39, and adjustment between these plates can be effected and maintained by the provision of a screw 61. This screw is carried by the bracket 54 and is threaded into a bore formed in the plate 44. It will be manifest that by rotating the screw 61 relative adjustment may be effected between the intermediate and top plates so as to control the cutting depth of the cutter 13.

In order to support the stock at its points of engagement with the cutter 13, there is provided a work holding or supporting structure. This structure consists of a post 62, which arises vertically from a transversely adjustable bar 63. This bar is connected with the intermediate plate 39, by forming one side of said plate with a dovetail groove 64, which is adapted to receive a similarly formed projection 65 provided on one side of the bar 63, this construction serving to effect the support of the bar 63 and at the same time to permit the latter to be adjusted laterally of the bed 2 and independently of the plate 39. The post 62 is provided with a slidable block 66, which is mounted for sliding movement within guides provided by the post, and the said block is connected with an adjustable dog 67, which includes a finger 68, disposed to underlie the stock 10. As the carriage moves longitudinally of the bed, it is necessary that the finger 68 should be gradually raised so as to maintain itself in contact with the stop and to accomplish this irrespective of the taper therein. This automatic raising and lowering of the finger 68 is effected by providing the outer end of the bar 63 with depending vertically journaled rollers 69, which are disposed for engagement with an adjustable guide strip 70 provided upon one of the side bars 3. The strip 70 is identical in construction with that of the strip 56, both of said strips being disposed so that the same will converge toward the head of the lathe and diverge toward the tail portion thereof, thus adapting the strips to the taper in the stock 10. By reason of the strip 70 it will be apparent that relative movement between the bar 63 and the intermediate plate 39 will take place during longitudinal travel on the part of the carriage as a whole. Then, in order that the movement of the bar 63 will result in raising and lowering the finger of the dog 67, the block 66 is provided with a screw 71, which passes through a vertical slot 72 formed in the post 62. The outer end of the screw 71 is connected with an angle plate 73, which is adapted for engagement with an inclined cam 74 carried by the top plate 44. Since the plate 44 is stationary with respect to the bar 63, it will be apparent that while the latter is reciprocated, the angle plate 73 will ride upon the cam 74, thus causing the block 66 to be raised, a feature which results in corresponding movement on the part of the dog 67 and thus its finger 68 is properly maintained in contact with the under part of the stock 10. A spring 75 is confined between the top of the post 62 and the upper end of the block 66, the said spring serving to maintain proper contact between the angle plate 73 and the cam 74. The inclination of the cam may be regulated by means of screws 76, which are disposed on opposite sides of the pivotal mounting 77 of the cam.

By reason of the construction described mechanism is provided which will serve to effect the rotatable positioning of stock in connection with the head and tail stock members 5 and 6 respectively, and by virtue of the peculiar carriage construction, a mounting will be provided for the cutter 13 which will serve at all times to properly engage with the stock 10, thus causing the latter to be properly rounded and truly finished so as to overcome all irregularities in the formation thereof and to provide the stock with a true longitudinal axis. Then, by reason of the guide strip construction 56, a means is provided whereby the carriage may be shifted laterally as well as longitudinally, so that the cutter will be adapted to the longitudinal taper to be produced in the stock. It will be understood that the carriage may be shifted longitudinally either by hand or by power, or both, and by reason of the lateral adjustment of the cutter the latter will be enabled to truly follow and finish the stock. Wear in the machine, or a change in the cutting depth thereof is capable of being readily taken care of by means of the screw adjustment provided between the intermediate and top plates of the carriage. Also, by reason of the crank arm construction 38, longitudinal travel of the carriage may be automatically arrested at any desired point. By means of the shifting bar 63, and the cooperative means for controlling its movement, a work holder is provided which will at all times properly engage with the stock irrespective of its taper, thus holding the stock during its period of engagement with the teeth of the rotary cutter, enabling the latter to travel at a high rate of speed, without splitting, marring or injuring the wood of the stock in any manner. To further prevent jarring or vibration in the stock while the same is being acted upon by the cutter, one of the bracket arms 45, is provided with an angle piece 78, to which is connected an adjustable work rest 79. This rest is adapted to engage with the upper part of the stock, to hold the latter in engagement with the finger 68 during the movement and operation of the cutter. These features for supporting the work or stock are of very considerable importance, in that they enable the machine to operate at relatively fast speeds, to thereby increase production and to reduce operating costs.

What is claimed is:

In a wood working lathe, a bed, head and tail stocks carried by the bed, a carriage associated with the bed and having a rotary cutter associated therewith, said carriage including a base and top plate and an intermediate plate, said plates being relatively movable, a bar slidable on the intermediate plate and having a work support carried thereby, said support including a finger for engaging the work, a cam carried by the top plate for raising the finger when the bar and cutter are moved toward each other, as and for the purpose set forth.

In testimony whereof I affix my signature.

GEORGE ALBER.